United States Patent [19]
Tanaka et al.

[11] 3,733,687
[45] May 22, 1973

[54] METHOD OF SOLDERING AN ALUMINUM METAL TO AN ALUMINUM OR ANOTHER METAL

[75] Inventors: Jun Tanaka; Toshihiko Taguchi; Yoshihiro Nishibori, all of Tokyo, Japan

[73] Assignee: Senju Metal Industry Co., Ltd., Tokyo, Japan

[22] Filed: May 25, 1971

[21] Appl. No.: 146,625

[30] Foreign Application Priority Data

May 30, 1970 Japan ................................45/46133
July 30, 1970 Japan ................................45/66128

[52] U.S. Cl..........................................29/504, 75/178
[51] Int. Cl..........................B23k 31/02, B23k 35/24
[58] Field of Search ......................75/178 AM; 29/504

[56] References Cited

UNITED STATES PATENTS 2,008,529  7/1935  Werley............................75/178 AM
2,426,650  9/1947  Sivian..............................29/503 UX
2,981,648  4/1961  Peterson et al..............75/178 AM X

FOREIGN PATENTS OR APPLICATIONS 362,507  12/1931  Great Britain ..................75/178 AM
427,238  4/1935  Great Britain ..................75/178 AM

OTHER PUBLICATIONS

Soldering Manual, prepared by American Welding Society Committee on Brazing and Soldering, copyright 1959, pp. 125–126. Group 320 technical literature.

Dept. of Commerce, Bureau of Standards Circular No. 78, "Solders for Aluminum," by W. S. Bates, Jan. 28, 1919.

*Primary Examiner*—J. Spencer Overholser
*Assistant Examiner*—Ronald J. Shore
*Attorney*—Stevens, Davis, Miller & Mosher

[57] ABSTRACT

A solder alloy and method for its use in soldering an aluminium metal consisting of:
Al 0.5 – 4.5% by weight
Cu 0.1 – 4% by weight
Mg 0.005 – 0.08% by weight
Ni 0 – 0.5% by weight
Cr 0 – 0.5% by weight, and
Zn balance.

5 Claims, 1 Drawing Figure

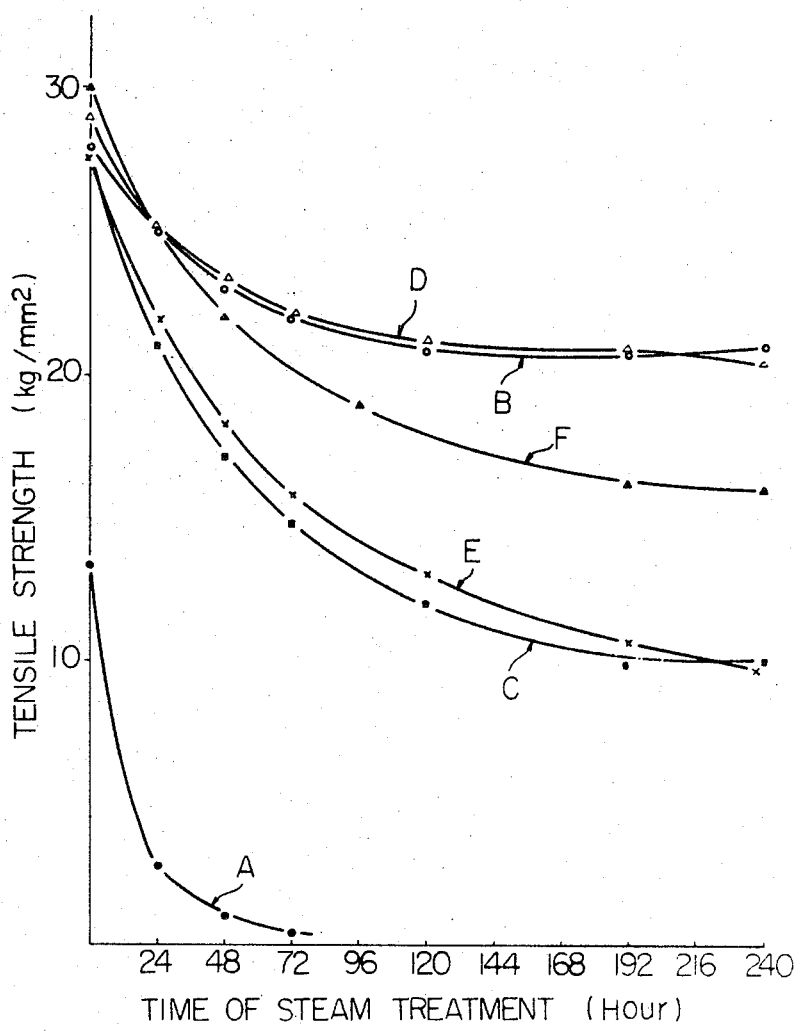

METHOD OF SOLDERING AN ALUMINUM METAL TO AN ALUMINUM OR ANOTHER METAL

BACKGROUND OF THE INVENTION

This invention relates to a solder for aluminum and aluminum alloys. More particularly, this invention relates to a solder suitable for joining aluminum or an aluminum alloy and another metal such as copper, brass or iron.

As is well known, soldering of aluminum or aluminum alloys (hereinafter, simply referred to as an aluminum metal) is extremely difficult because:

1. An aluminum metal has a hard and fast oxide film covering the surface thereof.
2. Even if an aluminum metal is soldered, that is, the aluminum metal is alloyed with a solder, the soldered part suffers remarkable electrolytic corrosion, since aluminum metals have lower electrode potentials and the difference of electrode potentials between the soldered part and the aluminum matrix is great.

In order to remove or penetrate the oxide film various kinds of soldering fluxes have been developed and various means such as ultrasonic soldering, rub soldering, etc. are employed. Therefore nowadays it is quite possible to wet the surface of an aluminum metal with a solder and thus solder the metal with the same metal or another metal.

Electrolytic corrosion, however, originates in the properties of the solder and the metals to be soldered per se, and therefore it is not solved by development of soldering fluxes or soldering methods. It is no exaggeration to say that the reason why soldering of aluminum metal has been regarded as impossible resides in this corrodability of the soldered parts.

The hitherto known solders for aluminum metals are divided into two major classes-
(1) tin-or cadmium-based rather low-melting point alloys containing 10 – 30 percent zinc, and (2) zinc-based rather high-melting point alloys containing aluminum and or copper.

The low-melting point solders are easy to work with, but the lack of resistance to corrosion of the soldered part is remarkable. The zinc-based high melting point solders form a good joint with aluminum metals and the soldered parts are superior in corrosion resistance to the soldered parts obtained with low melting solders.

However, the ZN-Al or ZN-Al-Cu alloy soldered parts are not corrosion-proof. It is merely that the corrosion proceeds more slowly than in the case of parts soldered with the Sn or Cd-based solder, because the difference in electrode potentials between Al and Zn is smaller. And if any tin, cadmium or lead exists, even in a slight amount, in the Zn-based solder, these metals precipitate at the grain boundaries and induce so-called intergranular corrosion, which results in cracking in that part. In addition, corrosion is accelerated if metals, the electrode potentials of which are very high, are heterogeneously distributed in a micro structure of the solder.

This naturally suggests that effects should be made to prepare Zn-based solders for aluminum metals containing little or no impurities. However, it has so far proved impossible to obtain zinc, the lead content of which is nil, and inclusion of small quantities of impurities is inevitable when a solder is produced, on a commercial basis.

It has been thought of to add about 0.1 percent magnesium to the Zn-based solder. Addition of magnesium impedes movement of atoms between crystals, thus stabilizing the micro structure of the alloy and preventing intergranular corrosion. Such a solder does improve corrosion resistance in the case of soldering between aluminum metals, but there is no significant difference in corrosion resistance when an aluminum metal is soldered to any other kind of metal such as copper, brass or iron. Also the addition of about 0.1 percent magnesium does not give satisfactory wetting property and fluidity to the solder.

For instance, an alloy consisting of 4% Al, 0.1% Mg and Zn balance is used for soldering an aluminum plate and a copper plate.

When a soldered specimen of the above combination is left exposed to a steam-saturated atmosphere at 95°–100° C, intergranular corrosion takes place in 3 days and the soldered part breaks down after 15 days.

If the Mg-content is raised to 0.5 percent, similar corrosion is observed. If the Mg content is raised further, not only is the corrosion resistance not further improved but the bonding ability (or solderability) is remarkably reduced.

With this background in mind, we searched for a solder more suitable for soldering an aluminum metal and copper, brass, iron, etc. And we have found a solder which gives a good joint between aluminum metals and between an aluminum metal and the above-mentioned metals, said joint having excellent corrosion resistance, by incorporating 0.005 – 0.08 percent of Mg and up to 0.5 percent of Ni and/or Cr in the Zn-Cu-Al alloy solder of a certain composition.

SUMMARY OF THE INVENTION

A typical solder of this invention consists of:
Al 0.5 – 4.5% by weight
Cu 0.1 – 4% by weight
Mg 0.005 – 0.08% by weight and the balance being Zn and is suitable for soldering an aluminum metal and an aluminum metal or an aluminum metal and another metal such as copper, brass, iron etc.

The solder of this invention gives good joint between the above-mentioned metals, and said joint has excellent corrosion resistance.

Other compositions of the solder of this invention are:

1. Al 0.5 – 4.5% by weight
Cu 0.1 – 4% by weight
Mg 0.002 – 0.08% by weight
Ni 0 – 0.5% by weight
Cr 0– 0.5% by weight, and
Zn balance 2. Al 2 – 4.5% by weight
Cu 0.5 – 3% by weight
Mg 0.005 – 0.009% by weight
Cr 0.1 – 0.4% by weight, and
Zn balance (3) Al 2 – 4.5% by weight
Cu 0.5 – 3% by weight
Mg 0.02 – 0.05% by weight
Ni 0.15 – 0.5% by weight, and
Zn balance

BRIEF DESCRIPTION OF THE DRAWING

The accompanying drawing is a graph in which tensile strength of a bulk solder is plotted at the indicated steam-treatment time, showing superiority of corrosion resistance of the instant invention alloys over the prior art alloy. Curve A represents tensile strength of a 5% Al-Zn alloy, and curves B, C, D, E and F respectively represent these of a 4.5%Al-3%Cu-0.4%Cr-0.009%Mg-Zn alloy, a 4%Al-3%Cu-0.4%Cr-Zn alloy, a 4.5%Al-3%Cu-0.5%Ni-0.03%Mg-Zn alloy, a 4%Al-3%Cu-0.1%Ni-Zn alloy, a 4%Al3%Cu-0.1%Mg-Zn alloy.

DETAILED DESCRIPTION OF THE INVENTION

Typical compositions of the solder of this invention have been given above. The function of each component and necessary and preferable content thereof are explained below.

Addition of at least 0.5 percent aluminum by weight improves solderability of the solder and enhances the strength of the resulting joint or soldered part and, further, prevents the brittleness caused by zinc. However, if more than 4.5 percent of Al by weight is added, brittleness is not prevented and, further, the grain of the alloy becomes coarse, which results in lowering of corrosion resistance. The aluminum content of 2 – 4.5% by weight is preferred.

Addition of at least 0.1 percent of Cu by weight enhances the strength of the soldered part and increases affinity to copper matrix when an aluminum metal and a copper metal are soldered. However, if more than 4% of Cu is added, the melting temperature of the solder is raised and, further the soldered portion gradually shrinks or swells. The copper content of 0.5 – 3% by weight is preferred.

The effect of magnesium is, as mentioned above, to prevent intercrystalline movement of the atoms, to keep the micro structure homogeneous, and thus to prevent intergranular corrosion. For this purpose, at least 0.005 percent of magnesium is necessary. More than 0.08 percent of magnesium impairs fluidity and wetting property of the solder to aluminum, and does not give improvement in corrosion resistance corresponding to the increase.

The addition of chromium improves corrosion resistance and, further, increases strength of the soldered part by reducing the grain size. About 0.05 percent of chromium by weight is necessary to improve the corrosion resistance. More than 0.5 percent of chromium does not easily dissolve in zinc matrix and raises the melting point of the solder.

The chromium can be partly or wholly replaced with the same amount of nickel, the function of which is quite the same as that of chromium.

The purpose of adding chromium and/or nickel is, as with the addition of magnesium, to improve corrosion resistance. However, addition of magnesium alone does not increase the corrosion resistance of the joint between an aluminum metal and another metal such as copper, brass and iron, whereas the use of magnesium and chromium and/or nickel in combination remarkably improves corrosion resistance in the above-mentioned case. This is the most remarkable feature of this invention.

The desirable ranges of magnesium and nickel or chromium are:

1. In case of chromium being added;
0.005 – 0.009% by weight magnesium, and 0.05 – 0.5% by weight chromium, preferably 0.005 – 0.009% by weight magnesium and 0.1 – 0.4% by weight chromium.

2. In case of nickel being added;
0.02 – 0.08% by weight magnesium and 0.05 – 0.5% by weight nickel, preferably 0.02 – 0.05% by weight magnesium and 0.15 – 0.5% by weight nickel. Impurities which are incidental in the ingredient metals of the solder of this invention are Sn, Pb, Cd, Fe etc. Of these, Sn, Pb and Cd promote intergranular corrosion, and therefore the proportion each of these elements must not be more than 0.01 percent. An Fe content of up to 0.1 percent of Fe is tolerable, having no deleterious effect on corrosion resistance and solderability. However, inclusion of impurities is undesirable and it is best to use materials of the highest possible purity.

If impurities such as Sn, Pb, Cd, etc. which form eutectic alloys with Zn, and have electrode potentials far different from that of Zn are included in the solder of this invention, intergranular corrosion of this solder is accelerated, and thus the Sn, Pb, Cd, etc. content should be kept within the above-mentioned limits.

For the same reason, the species of metals which can be soldered with this solder are restricted, and satisfactory results from the view point of corrosion are obtained in soldering an aluminum metal or an aluminum metal and copper, brass, iron, stainless steel, nickel or chromium.

Now the invention is illustrated by way of working examples.

Alloy samples the compositions of which are given in the following tables were prepared. For example, where the sample of Example 1 was prepared first of all, a Mg-Al mother alloy containing 10 percent by weight Mg and a Ni-Cu mother alloy containing 30 percent by weight Ni were prepared. A predetermined amount of zinc was melted in a graphite crucible, to which necessary amount of copper and the Ni-Cu mother alloy (30 percent Ni) were added, and finally necessary amounts of the Mg-Al alloy (10% Mg) and aluminum so as to produce a solder for aluminum.

First of all, corrosion tests pertaining to the solders per se were carried out, since corrosion of the joint formed by using zinc-based solders containing aluminum originates in corrosion of the solders per se. Corrodability of the solders was determined by tensile test of solder specimens before and after they were subjected to treatment with steam.

Specimens for this test were prepared as follows. A solder alloy sample was melted and cast into a brass mold from a melt of 450° C to make a specimen 8 mm in diameter and 150 mm in length. Thus obtained rod was turned so that the gage length 50 mm was a round rod having a diameter of 6.35 mm ± 0.05 mm.

The steam treatment of the specimens comprised letting them stand in saturated steam at 95 – 100° C for 10 days. Tensile tests were carried out with an Amsler universal tensile tester. It is conventionally believed that the above-mentioned steam treatment corresponds to exposure to normal conditions for 10 years.

Tensile tests of soldered joints were carried out as follows. A plurality of 20 × 50 mm strips were cut off from a 1.6 mm thick 52S (JIS H 4104) corrosion-resistant aluminum plate. To avoid the deleterious effect of used fluxes, we employed so-called rub soldering. A strip was picked up with pliers at one end and was heated by a gas burner flame. While the strip was being heated, a solder was rubbed in the surface of the strip to be soldered. The temperature of the aluminum strips should be higher than the melting temperature of the solder, in order that they should be soldered. The resulting solder-plated strip was held in a vise, and another strip was held by pliers so that it contacted the strip in the vise. The part to be joined was heated. When the solder melted, strips were put together so that 20 × 5 mm areas thereof overlapped. The two strips were pressed together with the pliers and cooled by pouring water thereupon. Excess solder that solidified on the joined strips was removed by a milling machine. The tensile strength of the joined strips was determined with an Amsler universal tensile tester, before and after the treatment with steam at 95 – 100° C for the indicated time. In each example, an average value of five test pieces is given in the table.

The corrosion tests on joint of aluminum and copper or steel was carried out as follows. A plurality of 30 × 30 mm strips were made of a 1.6 mm thick aluminum plate (1s, JIS H4101), a 0.5 mm thick copper plate (Cup1/22JIS H3101) and a 0.5 mm thick steel plate (2s, JIS G3101). An aluminum strip was bent into an angle and put on a copper or steel strip. A small portion of zinc chloride flux was applied to the parts in contact and heated to the melting temperature of a solder. A small piece of the solder was put on the contact parts, and the pieces were soldered. The remaining flux was washed away with water. The test pieces, which were kept in steam at 95 – 100° C for 5 days, 10 days and 15 days respectively, were checked by visual observation for development of corrosion on the surface soldered.

Soldering properties of solders were evaluated by ease and completeness of soldering when strips of aluminum were joined in the manner mentioned above. That is, it was checked whether or not the aluminum strips were wetted by a solder rubbed on their surface and whether or not a satisfactory joint was obtained. In evaluation of joint quality, the results of the above-mentioned tensile test were taken into consideration.

Conditions and results of the above-mentioned tests pertaining to solders of this invention are summarized in the following table together with those on similar solders outside of the scope of this invention and the known solders in the same category. The comparative data of the table clearly prove the superiority of the solders of this invention.

| Example | Al | Cu | Mg | Cr | Ni | Zn | Melting range (°C) | Tensile strength (kg./mm.$^2$) Before steam treatment | Tensile strength (kg./mm.$^2$) After steam treatment | Tensile 52S/52S joint(kg.) before steam treatment | Strength of soldered, after steam treatment |
|---|---|---|---|---|---|---|---|---|---|---|---|
| Example: | | | | | | | | | | | |
| 1 | 4.5 | 3 | 0.009 | 0.4 | | Balance | 374–396 | 28.0 | 21.0 | *578 | *577. |
| 2 | 4 | 1 | 0.008 | 0.1 | | do | 379–392 | 28.5 | 17.0 | *580 | *575. |
| 3 | 2 | 0.5 | 0.005 | 0.2 | | do | 379–405 | 21.0 | 14.0 | *575 | *570. |
| 4 | 4.5 | 3 | 0.03 | | 0.5 | do | 375–395 | 27.2 | 20.5 | *575 | *574. |
| 5 | 4 | 1 | 0.02 | | 0.3 | do | 380–392 | 26.0 | 19.5 | *570 | *570. |
| 6 | 2 | 0.5 | 0.05 | | 0.15 | do | 380–405 | 23.0 | 19.0 | *575 | *570. |
| Cp. example: | | | | | | | | | | | |
| 1 | 5 | | | | | do | 382 | 13.5 | ᵃ0.4 | *580 | *390. |
| 2 | 4 | 3 | | 0.4 | | do | 377–396 | 28.0 | 10.0 | *590 | ***450. |
| 3 | 4 | 3 | 0.1 | | | do | 377–398 | 30.0 | 16.0 | ***530 | ***500. |
| 4 | 4 | 3 | | | 0.1 | do | 375–395 | 28.0 | 10.0 | *590 | ***470. |
| 5 | 4 | | | 0.4 | | do | 379–390 | 25.5 | 15.0 | ***510 | ***495. |
| Rf. example: | | | | | | | | | | | |
| 1 | | | | | Sn 70 | 30 | 199–330 | 8.0 | 6.5 | **510 | **40 (5 days after). |
| 2 | | | | | Cd 70 | 30 | 265–294 | 14.0 | 12.0 | **400 | **30 (5 days after). |
| 3 | | | | | Sn 50 | Pb 50 | 183–215 | 5.0 | 4.0 | **115 | Breakdown (1 day after). |

ᵃ 3 days after.  
\* Broken at strip.   \*\* Broken at joint.   \*\*\* Partly broken at strip.

| | Corrosion resistance of IS/Cu(CuP₂½H) joint | | | Corrosion resistance of IS/iron (JIS G3102) joint | | | |
|---|---|---|---|---|---|---|---|
| | 5 days after steam treatment | 10 days after steam treatment | 15 days after steam treatment | 5 days after steam treatment | 10 days after steam treatment | 15 days after steam treatment | Soldering property |
| Example: | | | | | | | |
| 1 | Normal | Normal | Normal | Normal | Normal | Normal | Good, this invention. |
| 2 | do | do | do | do | do | do | Do. |
| 3 | do | do | do | do | do | do | Do. |
| 4 | do | do | do | do | do | do | Do. |
| 5 | do | do | do | do | do | do | Do. |
| 6 | do | do | do | do | do | do | Do. |
| Cp. example: | | | | | | | |
| 1 | Breakdown | | | Breakdown | | | Do. |
| 2 | Normal | Initial stage of corrosion | Advanced corrosion | Normal | Initial stage of corrosion | Advanced corrosion | Do. |
| 3 | Initial stage of corrosion | Advanced corrosion | Breakdown | Initial stage of corrosion | Advanced corrosion | Breakdown | Poor, Note (1). |
| 4 | Normal | Initial stage of corrosion | Advanced corrosion | Normal | Initial stage of corrosion | Advanced corrosion | Good. |
| 5 | Initial stage of corrosion | Advanced corrosion | Breakdown | Initial stage of corrosion | Advanced corrosion | Breakdown | Poor, Note (1). |
| Rf. example: | | | | | | | |
| 1 | Breakdown | | | Breakdown | | | Good. |
| 2 | do | | | do | | | Poor, Note (2). |
| 3 | do | | | do | | | Do. |

NOTE (1).—Non-joined parts remain because of incomplete wetting.  
NOTE (2).—The solder was not applied to aluminium by rubbing in Al, soldering flux was used.

The superiority of the solders of this invention in corrosion resistance is also shown in the accompanying drawing. This drawing compares corrosion resistance in term of tensile strength of a bulk solder of this invention and that of known solders which were subjected to steam treatment. Curve A stands for a 5Al-Zn alloy, curve B stands for the solder of Example 1 of this invention, curve C stands for a 4%Al-3%Cu-0.4%Cr-Zn alloys, curve D stands for the solder of Example 4 of this invention, curve E stands for a 4%Al-3%Cu-0.1%Ni-Zn alloy and curve F stands for a 4%Al-3%Cu-0.1%Mg-Zn alloy. This graph shows that the solder of this invention is superior in corrosion resistance.

We claim:

1. In a method for soldering aluminum or aluminum alloys, the improvement which comprises using as the alloy, a solder alloy consisting of:

Al 0.5 – 4.5% by weight
Cu 0.1 – 4% by weight
Mg 0.005 – 0.08% by weight
Ni 0 – 0.5% by weight
Cr 0 – 0.5% by weight
Zn balance.

2. The method of claim 1 wherein said soldering is carried out by means of ultrasonic soldering.

3. The method of claim 1 wherein said soldering is carried out by means of rub soldering.

4. The method of claim 1 wherein said aluminum or aluminum alloys are soldered to a metal selected from the group consisting of copper, brass, iron, stainless steel, nickel and chromium.

5. The method of claim 4 wherein the soldering operation is carried out by using a flux composition.

* * * * *